(12) United States Patent
Singh et al.

(10) Patent No.: US 7,920,540 B2
(45) Date of Patent: Apr. 5, 2011

(54) METHOD AND SYSTEM FOR RELIABLE BROADCAST OR MULTICAST COMMUNICATION IN WIRELESS NETWORKS

(75) Inventors: Harkirat Singh, Santa Clara, CA (US);
Huai-Rong Shao, San Jose, CA (US);
Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 989 days.

(21) Appl. No.: 11/801,602

(22) Filed: May 10, 2007

(65) Prior Publication Data
US 2007/0268868 A1 Nov. 22, 2007

Related U.S. Application Data

(60) Provisional application No. 60/801,285, filed on May 17, 2006.

(51) Int. Cl.
*H04B 7/212* (2006.01)
*H04J 3/24* (2006.01)
*H04W 68/00* (2009.01)

(52) U.S. Cl. .................. 370/347; 370/349; 455/458

(58) Field of Classification Search .................. 370/310, 370/347, 337, 345, 349; 455/458, 526, 500
See application file for complete search history.

(56) References Cited

U.S. PATENT DOCUMENTS

| | | | |
|---|---|---|---|
| 6,256,509 B1 | 7/2001 | Tanaka | 455/515 |
| 6,754,176 B1 | 6/2004 | Gubbi et al. | 370/230 |
| 6,934,752 B1 * | 8/2005 | Gubbi | 709/225 |
| 2003/0103521 A1 * | 6/2003 | Raphaeli et al. | 370/445 |
| 2005/0053015 A1 | 3/2005 | Jin | 370/464 |
| 2006/0203795 A1 * | 9/2006 | Welborn et al. | 370/345 |

FOREIGN PATENT DOCUMENTS
EP 0 709 982 B1 6/2004

OTHER PUBLICATIONS

Maruhashi, K. et al., "Wireless Uncompressed-HDTV-Signal Transmission System Utilizing Compact 60-GHz-band Transmitter and Receiver," System Devices Research Laboratories, NEC Corporation, Jun. 2005, pp. 1867-1870, Microwave Symposium Digest, 2005 IEEE MTT-S International, Japan.

(Continued)

*Primary Examiner* — Michael T Thier
(74) *Attorney, Agent, or Firm* — Kenneth L. Sherman, Esq.; Michael Zarrabian, Esq.; Myers Andras Sherman & Zarrabian LLP

(57) ABSTRACT

A method and system for communicating information over a wireless channel in a communication system including a coordinator and receivers, involves controlling channel access by dividing a contention-free period (CFP) into one or more schedules, wherein each schedule includes one or more periodical channel time blocks (CTBs) for wireless communication, reserving a CTB for reliable broadcast or multicast (ReBoM) communication of a data packet over the channel, transmitting the data packet from the coordinator over the channel during the reserved CTB, and receiving one or more acknowledgments for the data packet from one or more of the receivers. The data packet includes a header comprising ReBoM information indicating a multi-CTB ReBoM communication sequence for the data packet or a single-CTB ReBoM communication sequence for the data packet.

53 Claims, 13 Drawing Sheets

OTHER PUBLICATIONS

IEEE Computer Society, "Draft Standard Telecommunications and Information Exchange Between Systems—LAN/MAN Specific Requirements—Part 15.3: Wireless Medium Access Control (MAC) and Physical Layer (PHY) Specifications for High Rate Wireless Personal Area Networks (WPANs)," IEEE Draft P802.15.3/D16, Feb. 2003, pp. 1-362.

Hitachi, Ltd. et al., "High-Definition Multimedia Interface (HDMI)," Aug. 2005, pp. 1-214, Specification Version 1.2, HDMI Licensing LLC.

Van Veen, B. et al.., "Beamforming: A Versatile Approach to Spatial Filtering," Apr. 1988, pp. 4-24, vol. 5-Iss. 2, IEEE ASSP Magazine, Minneapolis, MN.

Multiband OFDM Alliance, et al., "Distributed Medium Access Control (MAC) for Wireless Networks," Nov. 1, 2005, pp. 1-182, Version 0.99, MBOA-SIG.

Patent Cooperation Treaty; Notification of Transmittal of the International Search Report and the Written Opinion of the International Searching Authority for PCT/KR2007/002398. Aug. 14, 2007.

\* cited by examiner

10

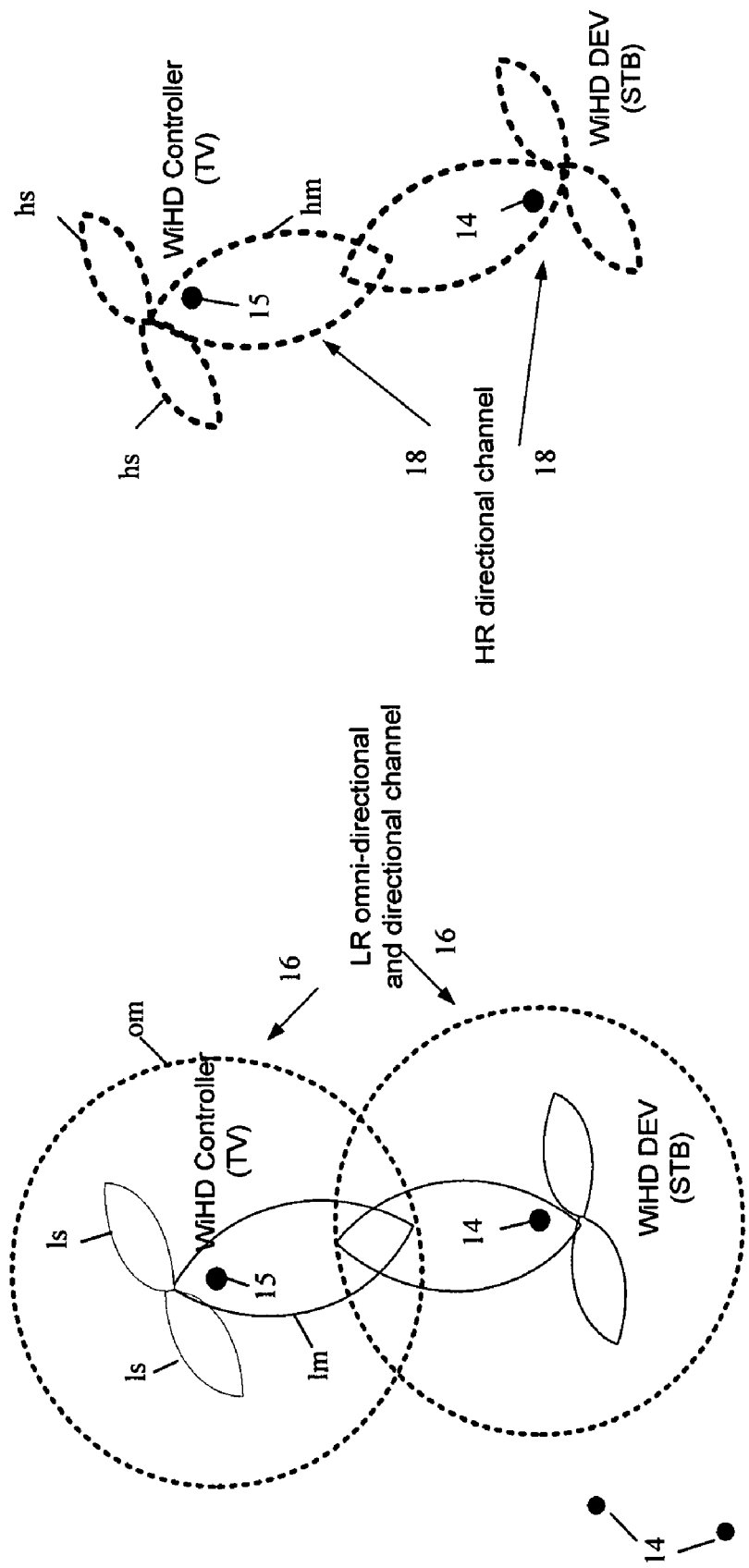

40

● Coordinator
○ Device

METHOD AND SYSTEM FOR RELIABLE BROADCAST OR MULTICAST COMMUNICATION IN WIRELESS NETWORKS

RELATED APPLICATION

This application claims priority from U.S. Provisional Patent Application Ser. No. 60/801,285, filed on May 17, 2006, incorporated herein by reference.

FIELD OF THE INVENTION

The present invention relates generally to communication networks and in particular to reliable broadcasting and multicasting in wireless networks.

BACKGROUND OF THE INVENTION

In wireless one-hop broadcast communications, each node broadcasts packets to inform all neighbors within an intended communication range of its existence. However, the packets from different nodes may interfere with one another due to the overlapping communication ranges. As such, establishing reliable one-hop broadcasting or multicasting in wireless networks is non-trivial.

A conventional attempt at achieving reliable broadcast is shown by a network 10 in FIG. 1 comprising a coordinator 11 and multiple stations 12. The coordinator 11 emulates reliable broadcast by transmitting multiple unicast packets to the multiple stations 12. Each station acknowledges a corresponding unicast. However, there is long latency before each packet can be delivered to each station reliably. The latency is proportional to the number of stations in the network or the number of unicast packets. Further, when a few stations have good channel access to the coordinator, then transmitting broadcast packets multiple times leads to bandwidth waste. There is, therefore, a need for a method and system for broadcast or multicast communication in wireless networks that addresses the above shortcomings.

BRIEF SUMMARY OF THE INVENTION

The present invention provides a method and system for reliable broadcast or multicast (ReBoM) communication in wireless networks, which achieves efficient channel utilization, and reduces the time required to reliably transmit broadcast packets to all interested stations. The present invention is applicable for both broadcasting and multicasting.

In one embodiment, a method and system for communicating information over a wireless channel communication system including a coordinator and receivers, involves controlling channel access by dividing a contention-free period (CFP) into one or more schedules, wherein each schedule includes one or more periodical channel time blocks (CTBs) for wireless communication, reserving a CTB for ReBoM communication of a data packet over the channel, transmitting the data packet from the coordinator over the channel during the reserved CTB, and receiving one or more acknowledgments for the data packet from one or more of the receivers. The data packet includes a header comprising ReBoM information indicating a multi-CTB ReBoM communication sequence for the data packet or a single-CTB ReBoM communication sequence for the data packet.

The communication sequence further involves receiving the transmitted data packet at a receiver, checking the packet header for the ReBoM information, based on the ReBoM information, checking the data packet for errors and generating an uplink (UL) acknowledgment packet indicating any errors in the data packet. For multi-CTB communication, reserving a CTB for acknowledgment and transmitting the acknowledgment packet to the coordinator over the channel during the CTB for acknowledgment according to a schedule indicated in the data packet. Lastly, for single-CTB communication, transmitting the acknowledgment packet to the coordinator over the channel during the same reserved CTB according to a schedule indicated in the data packet.

The communication sequence further involves receiving acknowledgments including, for single-CTB communication, receiving all acknowledgments for the data packet during said reserved CTB, and for multi-CTB communication, receiving each acknowledgment for the data packet during a different reserved CTB.

These and other features, aspects and advantages of the present invention will become understood with reference to the following description, appended claims and accompanying figures.

BRIEF DESCRIPTION OF THE DRAWINGS

FIG. 2A shows an example Wireless High Definition (WiHD) system comprising a network of multiple wireless devices implementing a channel access control protocol, according to an embodiment of the present invention.

FIG. 2B shows example directional beams for transmission of video information in the system of FIG. 2A.

DETAILED DESCRIPTION OF THE INVENTION

Figure 1:
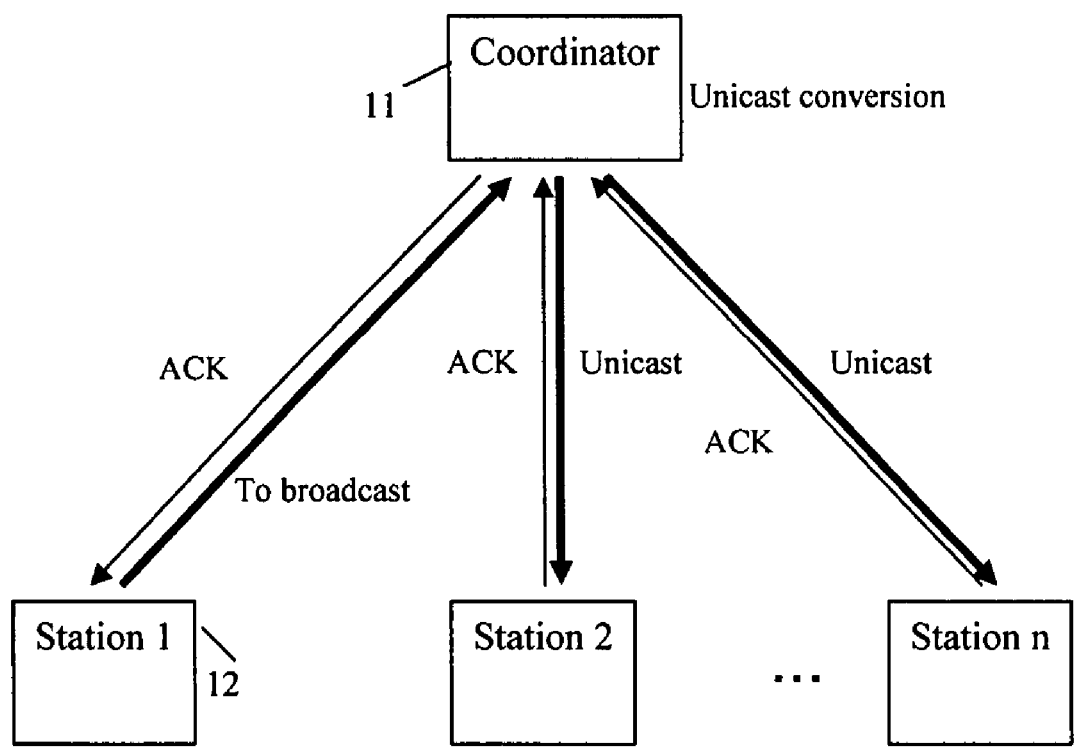
FIG. 1 shows a conventional wireless communication network including a coordinator and multiple devices.

The present invention provides a method and system for reliable broadcast or multicast (ReBoM) communication in wireless networks, which achieves efficient channel utilization, and reduces the time required to reliably transmit broadcast packets to all interested stations. The present invention is applicable for both one-hop broadcasting and multicasting. As such, the terms broadcasting and multicasting are used interchangeably herein.

An example implementation of the present invention is described below in conjunction with a wireless network for communication of video information such as high-definition (HD) video as in WirelessHD (WiHD). WiHD is an industry-led effort to define a wireless digital network interface specification for wireless high-definition (HD) digital signal transmission on the 60 GHz frequency band, e.g., for consumer electronics products. An example WiHD network utilizes a 60 GHz-band mmWave technology to support a physical (PHY) layer data transmission rate of multi-Gbps (gigabits per second), and can be used for transmitting uncompressed high-definition television (HDTV) signals wirelessly. The WiHD system includes wireless devices with multiple antennas, wherein directional beams are formed for transmitting/receiving HD data. Such a system can support a 1080p HD format which requires a raw data rate of about 2.98 Gbps (frame_size×number_of_frames_per_sec=1920×1080×3× 8*60).

FIG. 2A shows an example WiHD system comprising a network 13 of multiple WiHD devices 14 and 15. Each WiHD device utilizes two channels: a symmetric low-rate (LR) data/control channel 16 and an asymmetric high-rate (HR) data channel 18 (FIG. 2B). The LR channel operates in two modes: (1) in an omni-directional mode, which is used for the transmission of control data such as beacon, association/disassociation, device discovery, acknowledgement (ACK), etc., wherein the omni-directional mode supports data rates of about 2.5~10 Mbps (megabits per second); and (2) a directional or beamformed mode, which is used for transmitting audio streams, wherein the beamformed mode supports data rates of about 20~40 Mbps. The asymmetric HR data channel is a directional (beamformed) channel which is used for the transmission of uncompressed video from the WiHD sender 14 to the WiHD receiver 15. An example scenario in FIG. 2A, involves the WiHD sender 14 (e.g., a set-top box (STB)), transmitting uncompressed video to the WiHD receiver 15 (e.g., HDTV) over a HR channel. The HR channel supports data rates of multi-Gbps (e.g., 1~4 Gbps). In this scenario, the LR channel is used to send ACKs from the WiHD receiver 15 to the WiHD sender 14. A packet transmission duration on the HR channel can be from 100 µs (microsecond) to 300 µs. FIG. 2A further shows an omni-directional transmission om, main lobes lm, and side lobes ls, for the LR channel. FIG. 2B shows directional beams, comprising main lobes hm and side lobes hs, for the HR channel.

There are two approaches for a wireless station (STA) to access a shared wireless communication channel. One approach is a contention-free arbitration (CF) method, and the other is a contention-based arbitration (CB) method. There are multiple channel access methods for a CF period. For example, a point coordinator function (PCF) can be utilized to control access to the channel during the CF period. When a PCF is established, the PCF polls registered STAs for communications and provides channel access to the STAs based upon polling results. The CB access method utilizes a random back-off period to provide fairness in accessing the channel. In the CB period, a STA monitors the channel, and if the channel has been silent for a pre-defined period of time, the STA waits for a certain period of time, such that if the channel remains silent, the STA transmits on the channel.

Figure 3A:
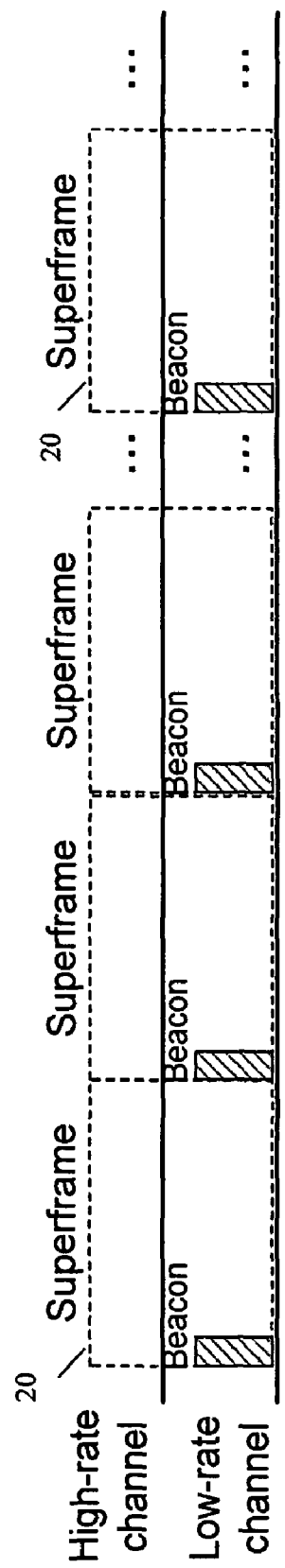
FIGS. 3A-B show an example superframe structure for dividing a CFP for shared channel access into multiple schedule periods for reliable broadcast or multicast (ReBoM) communication in the network of FIG. 2A, according to an embodiment of the present invention.
Figure 3B:
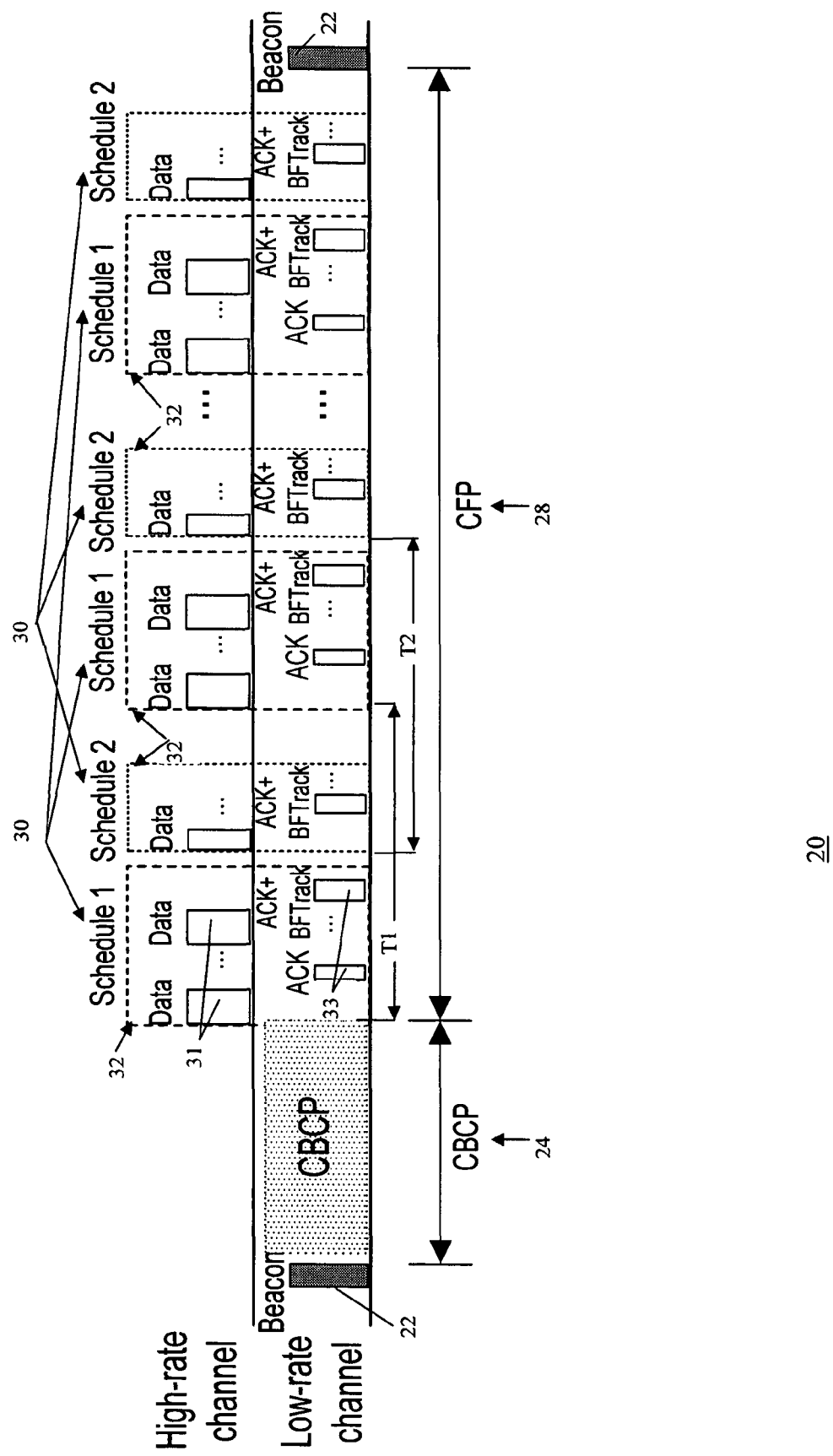

The HR and LR channels operate in a Time Division Duplex (TDD) scheduling mode, wherein, only one channel can be activated at any given instant for transmission. A broadcasting scheme according to the present invention is applied to the LR channel based on a superframe structure shown by example in FIGS. 3A-B. FIG. 3A shows a sequence of superframes 20. FIG. 3B shows details of a superframe 20 that divides a contention-free period (CFP) 28 for the LR and HR channels into multiple schedules 30. Each schedule 30 includes one or more periodical reserved channel time blocks (CTBs) 32 which are reserved for transmission of isochronous data streams. The schedules 30 represent reserved CTBs, and the time periods between the schedules 30 are unreserved channel time blocks (unreserved CTBs). As such, each superframe 20 includes two CTB categories: reserved CTBs 32 and unreserved CTBs (also called a contention-based control period (CBCP) 24). Such a superframe 20 is useful for channel access control using CTBs for transmission of uncompressed video over wireless channels (e.g., the high-rate channel 18 and the low-rate channel 16). Specifically, the superframe 20 includes:

1. A Beacon frame ("Beacon") 22 which is used to set timing allocations and to communicate management information for the network 13 (e.g., WiHD sub-net). It is assumed that beacon signals are always transmitted omni-directionally.
2. A contention-based control period (CBCP) 24 which is used to communicate control and management commands on the low-rate channel 16, if it is present in the superframe 20. No information can be transmitted on the high-rate channel 18 within the CBCP period. There can also be a beam-track period (BTP) between the CBCP 24 and the CFP 28 to search transmission beams and adjust beamforming parameters (e.g., every 1~2 seconds a BTP can appear in the corresponding superframe 20).
3. The CFP 28 which includes said CTBs, wherein the CTBs are reserved by one or multiple stations 14 for transmission of commands, isochronous streams and asynchronous data connections.

The reserved CTBs are used to transmit commands, isochronous streams and asynchronous data connections. Each CTB can be used for transmitting a single or multiple data frames. The schedules 30 organize the reserved CTBs. In each superframe 20, a schedule 30 can have one reserved CTB (e.g., for pre-scheduled beam-searching or bandwidth reservation signaling) or multiple periodical reserved CTBs (e.g., for an isochronous stream). Unreserved CTBs are typically used to transmit AV control messages such as CEC (Consumer Electronics Control) commands and MAC control and management commands on the LR channel. No beamforming transmission is allowed within the unreserved CTBs.

A Beacon 22 is transmitted periodically to identify the start of every superframe 20. Configuration of the superframe 20 and other parameters are included in the Beacon 22. For example, the Beacon 22 indicates the start time and length of the periods CBCP 24 and CFP 28. In addition, the Beacon 22 dictates allocation of the CTBs in the CFP 28 to different stations 14 and streams.

As noted, channel access in the CFP 28 is based on a Time Division Multiple Access (TDMA) method for shared medium access. TDMA allows several nodes to share the same channel frequency by dividing it into different timeslots. The nodes transmit in rapid succession, one after the other, each using its own timeslot. This allows multiple nodes to share the same channel while using only the part of the channel bandwidth they require. For example, a personal area network (PAN) including multiple WiHD devices (such as a DVD, HDTV, STB, home theater, media server, printer, overhead projector, etc.) can be managed by a TDMA based protocol such as the IEEE 802.15.3 MAC. Another example of a high data rate PAN is MBOA or wireless USB. One device acts as the coordinator which is responsible for managing CF and CB periods or superframe 20 as shown in FIG. 3B. The coordinator periodically transmits a Beacon to disseminate various timing information such as CB control periods, CF data periods, time synchronization, etc. As shown in FIG. 3B, within each reserved schedule 30 multiple packets 31, 33 are exchanged. Data packets 31 are transmitted over the HR channel and corresponding ACK packets 33 are transmitted over the LR channel. The time periods T1 and T2 in FIG. 3B refer to CTB-1 and CTB-2, respectively.

The transmission from the coordinator 15 (FIG. 2A) to devices 14 is referred to as a DL (downlink) transmission. On the other hand, transmission from a device 14 to the coordinator 15 is referred as an UL (uplink) transmission. Before invoking a ReBoM communication of data on the LR channel according to an embodiment of the present invention, the coordinator 15 obtains information from the higher layer, such as an Audio Video/Control (AV/C) layer, about the list of stations/devices (DEVs) 14 that such data needs to be reliably delivered to.

In one embodiment, a ReBoM communication can be spanned over a single-CTB or multiple-CTBs termed single-CTB process or a multi-CTB ReBoM process, respectively. In both processes, the coordinator reserves one or more CTBs to complete a ReBoM sequence. In the single-CTB process, the ReBoM sequence (i.e., DL transmissions and responsive UL transmissions) is completed within a single contiguous reserved CTB. Preferably, the single-CTB process is utilized when there is sufficient free bandwidth available in the superframe 20.

The multi-CTB process is utilized when the ReBoM sequence (i.e., DL transmissions and responsive UL transmissions) is spanned over multiple reserved CTBs. For example, the ReBoM sequence spans over multiple reserved CTBs when a superframe 20 does not have sufficient free bandwidth available (e.g., when 2×1080i streams are active, a superframe 20 may not have enough free bandwidth for additional data).

Figure 5:
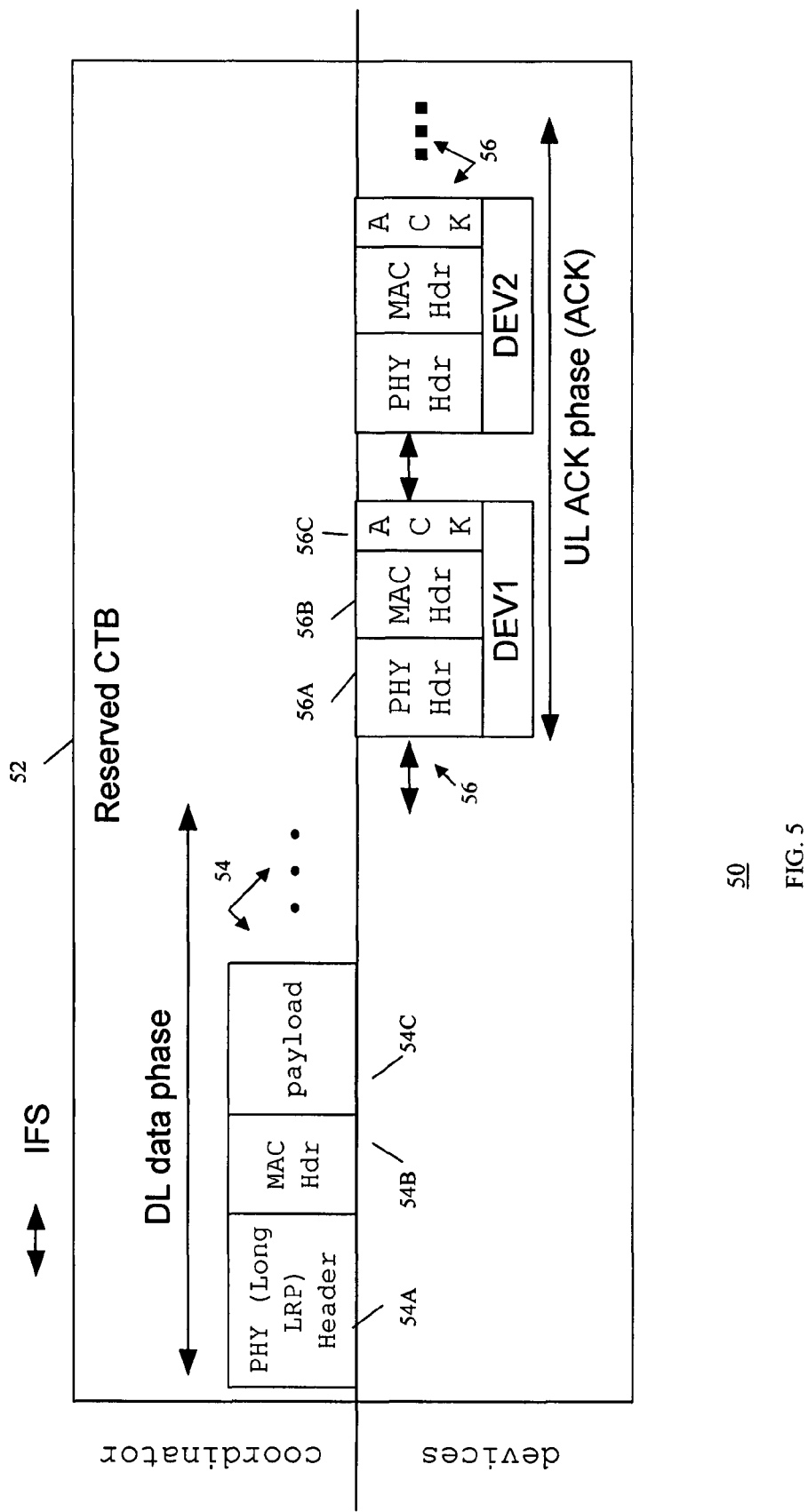
FIG. 5 shows an example of single-CTB ReBoM communication, according to an embodiment of the present invention.

For a DL transmission of a data packet 31 from the coordinator 15, the packet MAC header (e.g., MAC header 54B in FIG. 5 indicates that the data packet is part of a ReBoM sequence, whereby the DEVs 14 in the WiHD network (FIG. 2A) interpret the data packet accordingly. In one example, when a ReBoM field (e.g., a bit), part of the MAC control in the MAC header of a data packet, is set to "1" by the coordinator 15 (indicating that the data packet is part of a ReBoM sequence), additional fields are added to the MAC header, indicating the identity of DEVs which the DL packet is intended for, and an acknowledgment request from one or more of the DEVs. In one example, such additional fields include a DestID bitmap and an AckResponse bitmap in the MAC header of the data packet. Table 1 shows examples of the DestID bitmap and the AckResponse bitmap. In one embodiment, instead of two eight octet fields one eight octet field is included.

TABLE 1

A bitmap of DEVs

| Octets: 8 | 8 |
|---|---|
| DestID bitmap | AckResponse bitmap |

Figure 4:
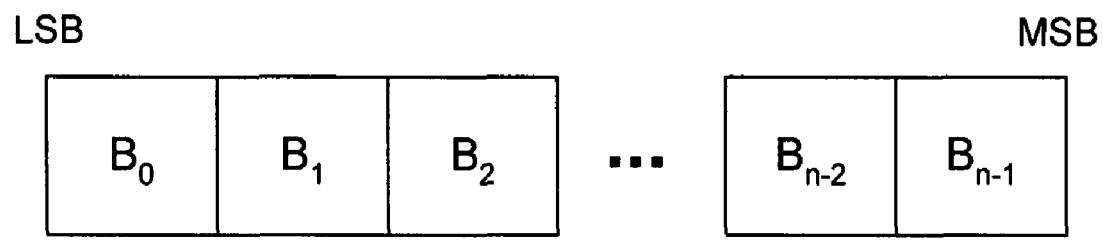
FIG. 4 shows an example AckResponse bitmap in the Media Access Control (MAC) header of a downlink (DL) data packet for ReBoM communication, according to an embodiment of the present invention.

FIG. 4 shows an example of a bitmap 40 (need to tie with DestID bitmap), having n bits ($B_0, \ldots, B_{n-1}$), from a least significant bit $B_0$ (LSB) to a most significant bit (MSB) $B_{n-1}$. Each bit in the DestID bitmap represents a device identification (DEVID). Thus, if bit n in the DestID bitmap is set, then the data packet is intended for the DEV with DEVID=n. Said DestID bitmap (destination ID or address) field is set to broadcast ID (BcstID) or multicast ID. The length of the DestID bitmap field depends on the maximum number of DEVs in the WiHD network since each bit in the DestID bitmap represents one DEVID.

The AckResponse bitmap is a request field that indicates that upon receiving a packet, a DEV is to send back an ACK packet to the coordinator in a scheduled manner. Each bit AckResponse bitmap when set to 1 indicates that the DEV with a DEVID equal to the bit position is to reply with an ACK packet in a scheduled manner, as described further below. Normally, a DestID bitmap and an AckResponse bitmap may have the same value. In some cases, if an ACK is not requested from a few devices, then the AckResponse bitmap can be different in value from the DestID bitmap. If the DestID and AckResponse fields are combined into one eight octet field then the devices intended to receive the ReBoM data packet and the devices intended to generate an ACK packet in response to the received ReBoM data packet are the same.

The DL packet MAC header also includes a field indicating if the packet is the last packet in the DL sequence. The DL packet further includes a cyclic redundancy code (CRC) field which can be used by a receiving DEV to determine if the DL packet is correctly received. For a DL transmission, the DL packet MAC header indicates that it is a ReBoM sequence, and the MAC header also specifies one of single-CTB or multi-CTB ReBoM DL processes that the coordinator is using for the DL transmission.

FIG. 5 illustrates an example communication sequence 50 based on a single-CTB ReBoM sequence, according to the present invention. The coordinator initiates a DL packet transmission in a DL data phase of a reserved CTB 52. An example DL packet 54 (e.g., packet 31 in FIG. 3B) includes a PHY header 54A, a MAC header 54B and a data payload 54C. After transmitting a DL data packet 54 to one or more DEVs 14 identified in the MAC header 54B of the DL packet 54 (set according to Table 1), the coordinator 15 waits to receive responsive UL ACK packets 56 from said identified DEVs 14s.

After a DEV 14 receives a DL data packet 54 from the coordinator 15, the DEV 14 responds with a UL transmission (ACK). For a UL transmission in a single-CTB ReBoM sequence as indicated in the AckResponse bitmap in the MAC header 54B by the coordinator, the DEV waits for a duration (DUR) time units (according to relation (1) below), from the end of the DL transmission of the DL packet 54 before transmitting an ACK packet 56 in the reserved CTB 52, wherein N represents the total number of 1's in the DestID bitmap, starting from the LSB till the bit position corresponding to that DEV's DEVID.

$$DUR = N*IFS + (N-1)*Ack_{Duration} \qquad (1)$$

IFS represents an Inter-Frame Space (IFS) duration for channel switching and other overhead. $Ack_{Duration}$ time units represents the amount of time needed for UL transmission of an acknowledgment packet.

Each ACK packet 56 includes a PHY header 56A, a MAC header 56B and an acknowledgment 56C which indicates if a corresponding DL packet 54 was received correctly. The DEVs send back ACK packets 56 in their scheduled UL slots in the reserved CTB 52. The UL ACK schedule is determined according to relation (1) above.

Figure 6:
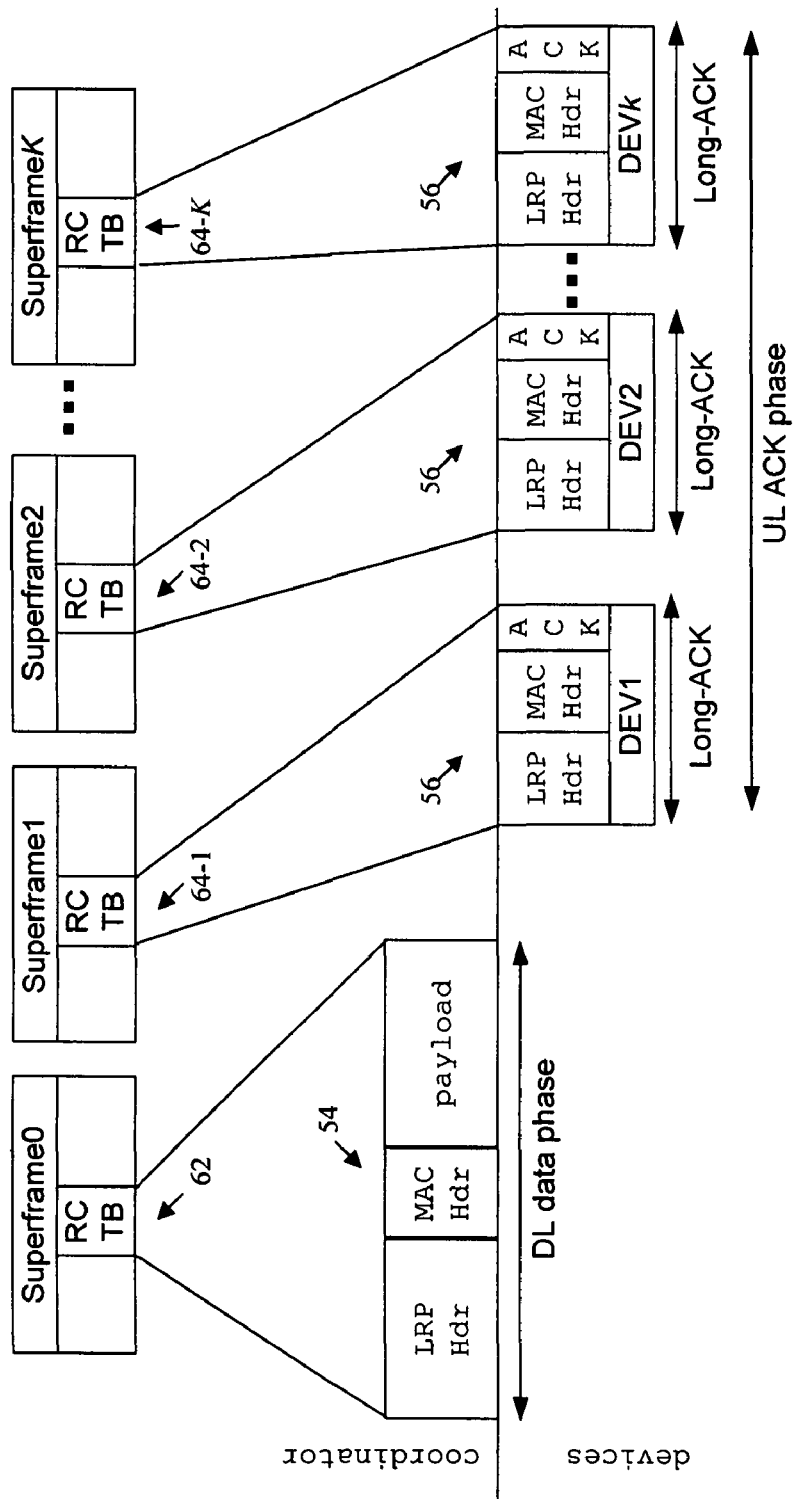
FIG. 6 shows an example of multi-CTB ReBoM communication, according to an embodiment of the present invention.

FIG. 6 illustrates an example communication sequence 60 based on a multi-CTB ReBoM sequence, according to an embodiment of the present invention. As shown, each superframe either accommodates one DL ReBoM (Data) packet or one UL ReBoM (ACK) packet. Similar to the single-CTB ReBoM sequence, in a superframe 20 (e.g., superframe0) the coordinator initiates a DL transmission in a reserved CTB (RCTB) 62 for transmitting a DL packet 54. The MAC header 54B in the DL packet 54 is set according to Table 1 for a multi-CTB ReBoM sequence as described above.

Upon receiving the DL packet 54 in a superframe 20, each receiving DEV responds with a UL ACK packet 56 during reserved CTBs (e.g., RCTBs 64-1, . . . , 64-K) in the subsequent superframes (e.g., superframe1, . . . , superframeK). The coordinator reserves the CTBs before starting the Multi-CTB sequence. Specifically, after a DEV receives a DL packet 54 from the coordinator, for a UL transmission in a multi-CTB ReBoM sequence, the DEV transmits an ACK packet 56 in a reserved CTB in the $N^{th}$ superframe 64-N from the superframe 62 in which the DL transmission occurred, where N represents the total number of 1's in the DestID bitmap in the MAC header 54B, starting from the LSB till the bit position corresponding to the DEV's DEVID (wherein N is an example number less than K). The timing of each superframe in FIG. 6 is calculated according to the schedules 30. Implicitly, the CTBs can be used for sending UL ACKs. It is possible that the coordinator can explicitly assign these CTBs to different stations and include the sending and receiving stations MAC addresses.

For either a single-CTB ReBoM sequence or a multi-CTB ReBoM sequence, after the UL transmission phase is over, the coordinator schedules retransmissions if one or more of the UL ACKs are not received, or one or more of the received UL ACKs indicate that one or more of the DEVs did not properly receive the DL packet 54. In a retransmission packet, the coordinator updates the AckResponse bitmap based on the UL ACKs. For example, a bit k corresponding to a DEV with DEVID=k is set to "0" if the coordinator correctly received the ACK from that DEV. The DestID bitmap field of the retransmitted packet is also updated accordingly. The coordinator retries transmitting the retransmission packet for ReBoMTransmitLimit times before discarding the packet.

In some cases, a ReBoM may not be required. In such cases, including the AckResponse bitmap in the DL packet MAC header causes unnecessary transmission overhead. Instead as noted, the MAC header includes information such as a ReBoM bit indicating whether it is a ReBoM or a No-ReBoM packet. When the ReBoM bit is set is "0", the ReBoM scheme is disabled, and the coordinator does not include the DestID and AckResponse bitmaps. However, when said ReBoM bit is set to "1", the ReBoM scheme is enabled, and communication proceeds as described above.

Figure 7:
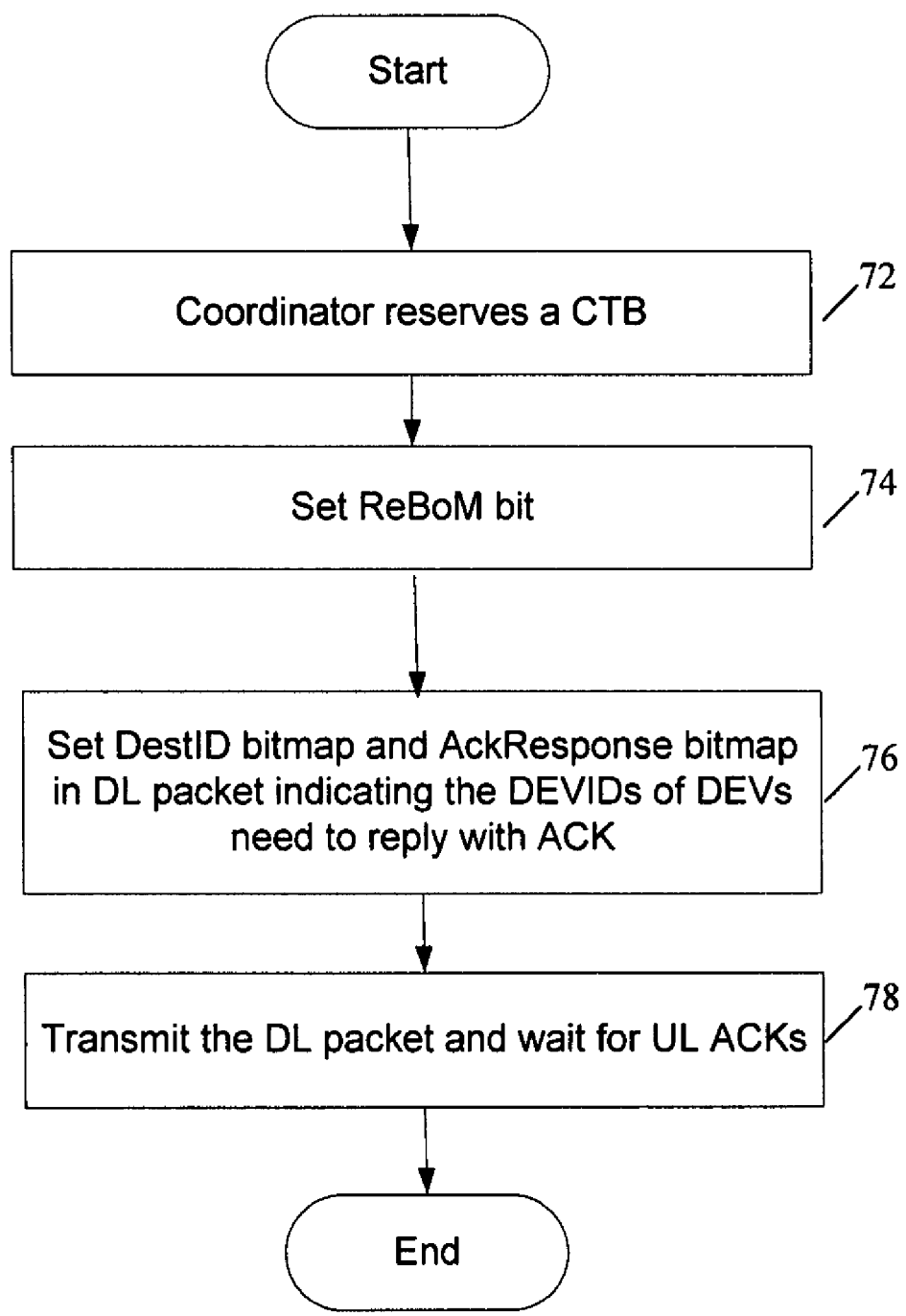
FIG. 7 shows a flowchart of a downlink transmission process at a coordinator for ReBoM communication, according to an embodiment of the present invention.

FIG. 7 shows a flowchart of an example process 70 implemented by the coordinator for a DL data packet transmission to DEVs, including the steps of:

Step 72: Reserve a CTB for DL data packet transmission.

Step 74: Invoke a ReBoM sequence by setting the ReBoM bit in the DL packet MAC header to "1".

Step 76: Set the DestID bitmap and AckResponse bitmap in the DL packet header, indicating the DEVIDs of DEVs the ReBoM packet is intended to (as indicated by the DestID bitmap) and the DEVs that need to reply to the DL packet with UL ACKs (as indicated by the Ack-Response bitmap).

Step 78: Transmit the ReBoM DL packet during the reserved CTB and wait for the UL ACKs.

Figure 8:
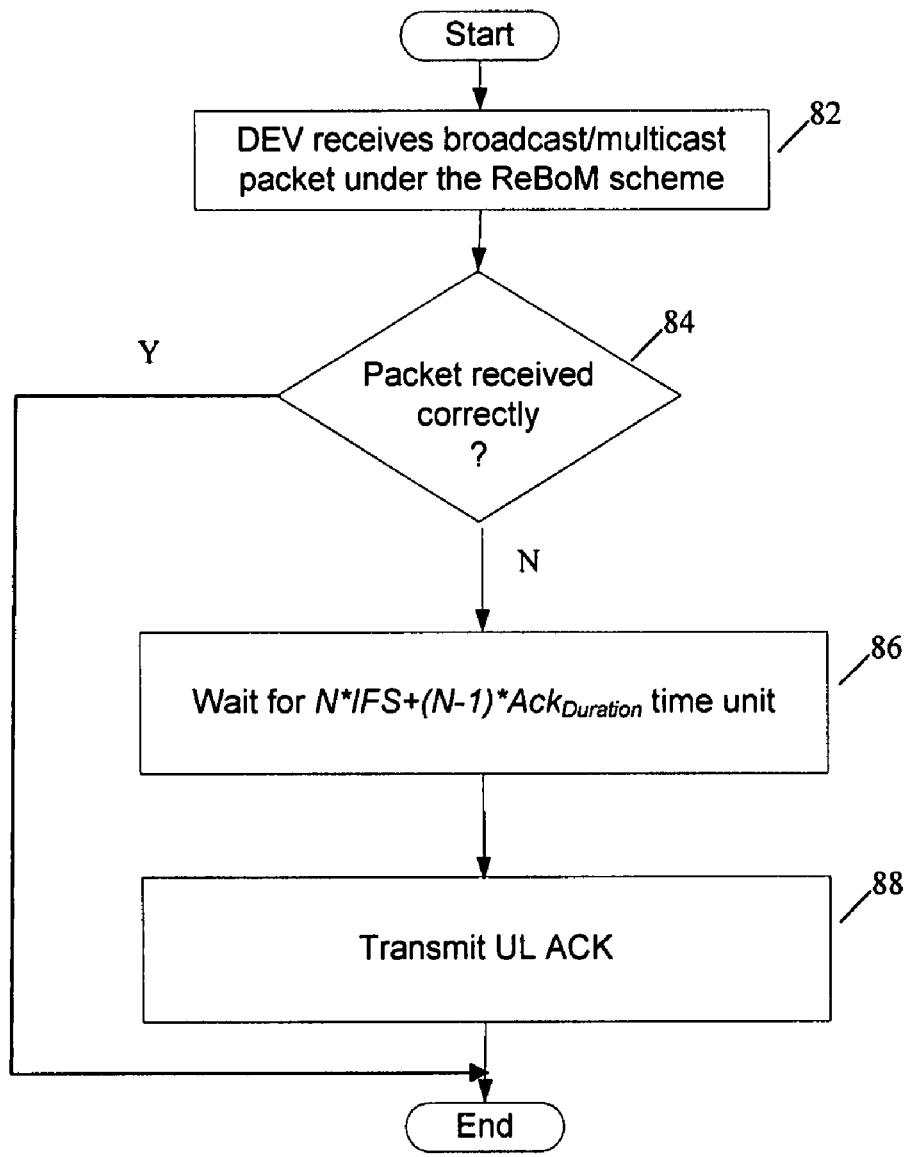
FIG. 8 shows a flowchart of an uplink transmission process at a receiver for ReBoM communication, according to an embodiment of the present invention.

FIG. 8 shows a flowchart of an example process 80 implemented by a receiving DEV for UL data transmission, including the steps of:

Step 82: Receive the broadcast/multicast DL packet under the ReBoM scheme.

Step 84: Determine if the DL packet was received correctly? If yes, go to step 86, otherwise, go to step 88.

Step 86: Wait for $N*IFS+(N-1)*Ack_{Duration}$ time units.

Step 88: Transmit an UL ACK indicating successful receipt of the DL packet at the DEV. Proceed to receive next DL packet.

Figure 9:
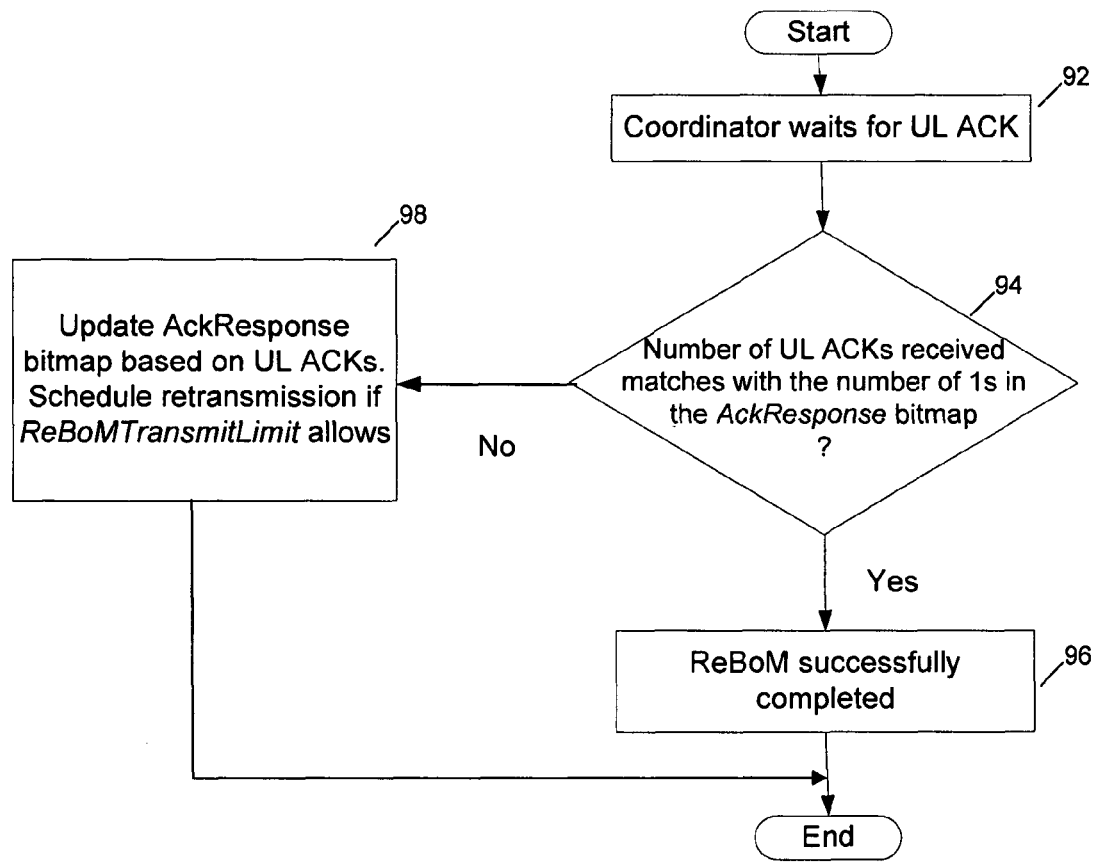
FIG. 9 shows a flowchart of an uplink receiving and downlink retransmission process at a coordinator for ReBoM communication, according to an embodiment of the present invention.

FIG. 9 shows a flowchart of an example process 90 implemented by the coordinator for receiving UL ACKs and invoking retransmissions when needed, including the steps of:

Step 92: Waits for all UL ACKs.

Step 94: Number of UL ACKs received matches with the number of 1's in the AckResponse bitmap of the transmitted DL packet? If yes, go to step 96, otherwise, go to step 98.

Step 96: ReBoM transmission sequence successfully completed. End/Stop.

Step 98: ReBoM transmission not completed sequence successfully, update AckResponse bitmap in a retransmission packet based on the UL ACKs. Schedule retransmission if ReBoMTransmitLimit allows.

Figure 10A:
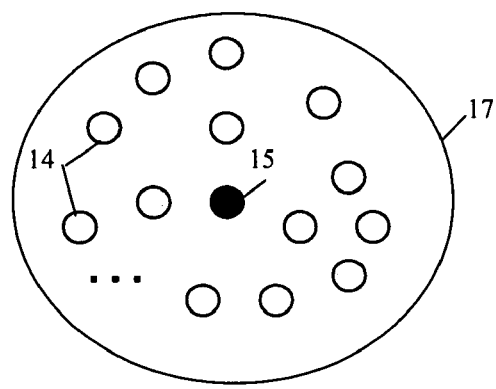
FIGS. 10A-B show examples of omni-directional and beamformed channels, respectively, for ReBoM communication, according to an embodiment of the present invention.
Figure 10B:
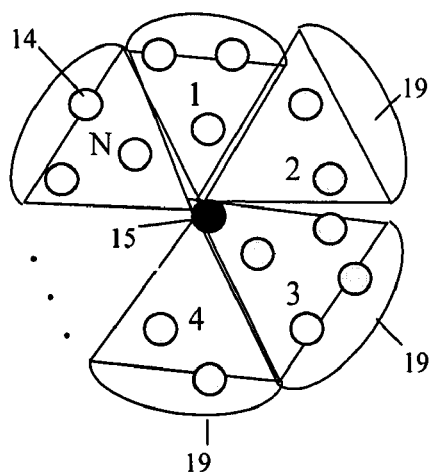

In one embodiment of the present invention, if the coordinator is aware of the angular position of each DEV in the WiHD network, the coordinator can use this information to optimize the UL ACK phase. This is because though wireless links are time-varying, DEVs in the same angular proximity observe identical channel conditions. Under this assumption, the coordinator can optimize UL ACKs as shown by example in FIGS. 10A-B, wherein the coordinator 15 divides the omni-directional channel (17 in FIG. 10A) into N directional or beamformed channels (19 in FIG. 10B). Since the coordinator is aware of the angular position of all DEVs, a priori, the coordinator selects one DEV per beamformed channel. Only the selected DEV transmits back a UL ACK frame. Further, since within a beamformed channel the SNR (signal-to-noise) ratio can vary, the coordinator selects a DEV which would have received an average or a minimum SNR in the beamformed channel. A successful UL ACK implies that all devices in the beamformed channel correctly received the ReBoM DL packet.

Reliable broadcasting according to the present invention is achieved using an efficient ReBoM scheme, wherein only one copy of the data packet is transmitted, followed by an ACK from the receiving devices. This has many applications such as distribution of critical control data, security keys, CEC control messages, etc. In one example, the ReBoM scheme according to the present invention is implemented in the MAC layers of the coordinator and DEVs.

In this description, a coordinator, such as an access point (AP) is a type of a wireless communication device such as an access point. Similarly, a device or DEV is also a type of a wireless communication station. In one example, each wireless communication station is capable of transmitting and/or receiving over a wireless channel in a wireless communication system. Therefore, a wireless communication station herein can function as a transmitter, a sender, a receiver, an initiator and/or a responder.

Figure 11:
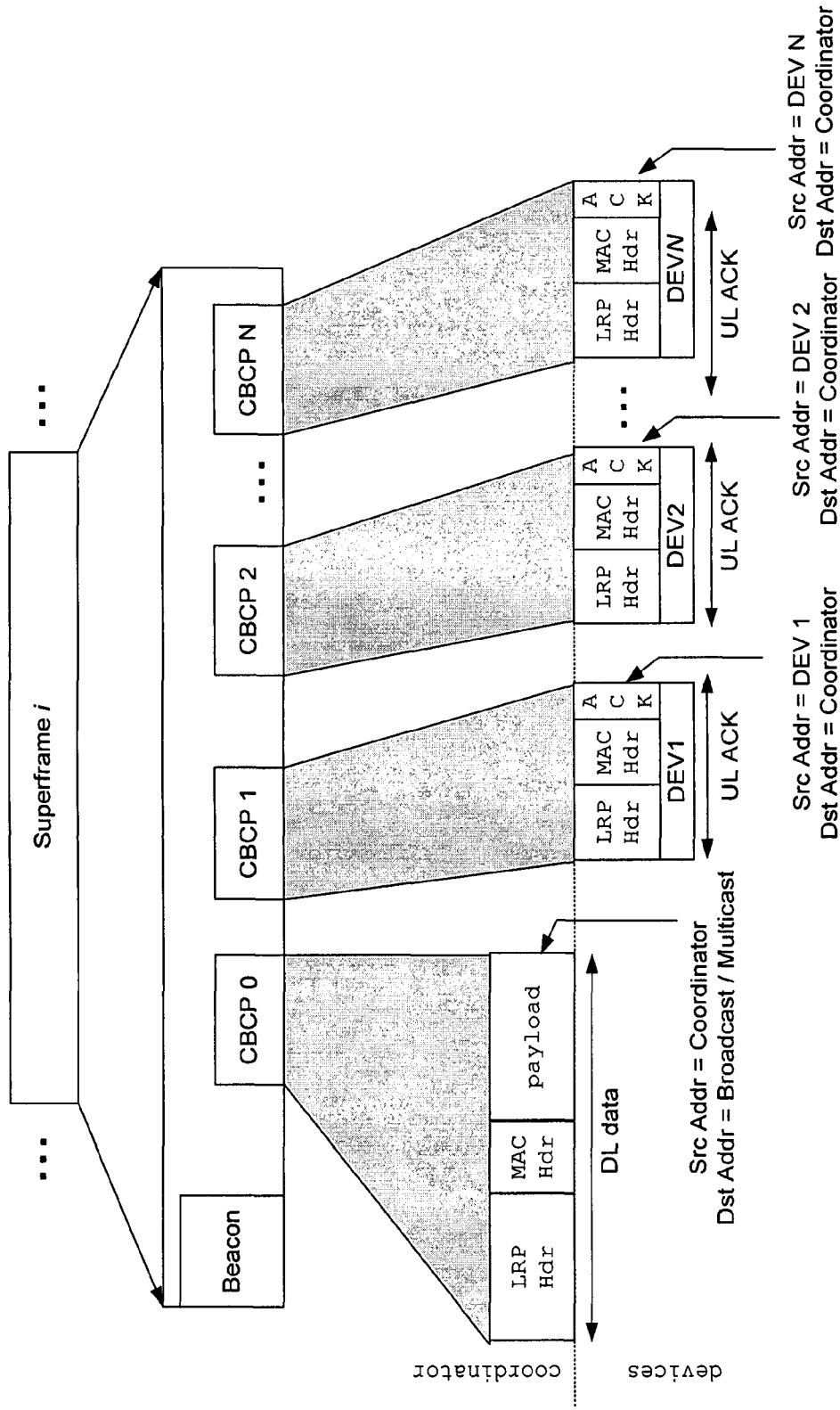
FIG. 11 shows another example superframe structure for ReBoM communication, according to the present invention.

Referring to the superframe structure 100 in FIG. 11, further according the present invention, ReBoM need not occur in reserved CTBs only, since ReBoM can be used with CBCPs such that for the first CBCP (CBCP 0) the source is set to a coordinator and the destination is set to a broadcast or multicast address as indicated in the DestID bitmap. Thereafter, the coordinator can assign CBCPs for UL ACK transmission such that in one CBCP one UL ACK is transmitted. For a station with a MAC address k, the coordinator allocates a CBCP for the station with the source address as the MAC address of the station, K, and the destination address is set to the MAC address of the coordinator. As such, as shown in FIG. 11, the coordinator allocates CBCP 1, . . . , CBCP N for DEV 1, . . . , DEV N, respectively.

Figure 12:
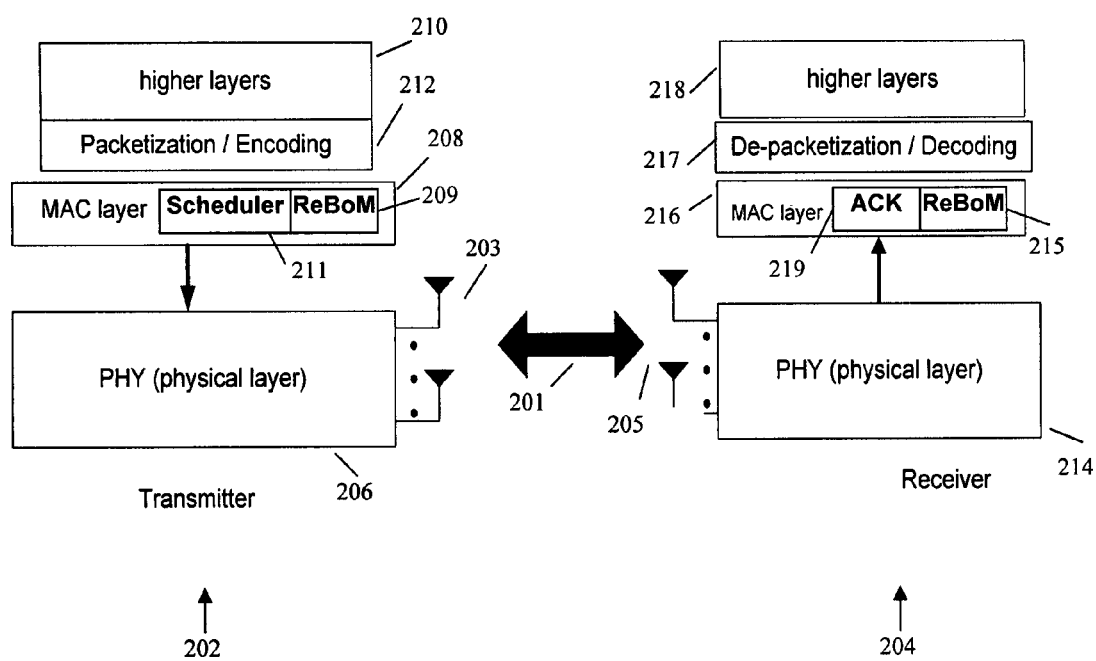
FIG. 12 shows a functional block diagram of an example communication system implementing a ReBoM communication protocol, according to an embodiment of the present invention.

FIG. 12 shows a functional block diagram of an example communication system 200 implementing a ReBoM communication protocol, according to an embodiment of the present invention. The system 200 includes a WiHD transmitter (and/or coordinator) 202 and a WiHD receiver 204. The transmitter 202 includes a PHY layer 206 and a MAC layer 208. Similarly, the receiver 204 includes a PHY layer 214 and a MAC layer 216. The PHY and MAC layers enable wireless communication between the WiHD transmitter 202 and the WiHD receiver 204 via transmit antennas 203 and receiver antennas 205, respectively, over a wireless channel 201.

The MAC layer 208 receives data packets from a packetizing module 212 which packetizes information from higher levels 210 into data packets. The MAC layer 208 then converts each data packet into a MAC packet by adding a MAC header to each data packet. The MAC layer 208 further includes a ReBoM communication module 209 that implements the above communication steps according to the present invention. The MAC packets are then provided to the PHY layer 206. The PHY layer 206 adds a PHY header to each MAC packet for transmission to the WiHD receiver 204 via transmit antennas 203. For a coordinator function, the MAC layer 208 also includes a scheduler 211 that generates schedules of CTBs in superframes for data transfer as described above.

In the receiver 204, the PHY layer 214 receives transmitted packets. The MAC layer 216 processes each received packet and performs ReBoM processing in a communication module 215 according to the steps above. The module 215 is configured for receiving a transmitted data packet, checking each packet header for ReBoM information and checking the data packet for errors based on the ReBoM information. An acknowledgment module 219 is configured for generating an UL ACK packet indicating any errors in the data packet, and transmitting the acknowledgment packet to the coordinator over the channel during the same reserved CTB according to a schedule.

The WiHD receiver 204 further includes a de-packetization module 217. The de-packetization and decoding module 217 receives the processed packets from the MAC layer 216 and provides the bits in the packets to higher layers 218.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of communicating information over a wireless channel in a communication system including a coordinator and receivers, comprising:
   controlling channel access by dividing a contention-free period (CFP) into one or more schedules, wherein each schedule includes one or more periodical channel time blocks (CTBs) for wireless communication;
   reserving a CTB for reliable broadcast or multicast (ReBoM) communication of a data packet over the channel;
   transmitting the data packet from the coordinator over the channel during the reserved CTB; and
   receiving one or more scheduled acknowledgments for the data packet from one or more of the receivers, wherein the information comprises uncompressed video information, wherein:
   the data packet includes a header comprising ReBoM information indicating a multi-CTB ReBoM communication sequence for the data packet or a single-CTB ReBoM communication sequence for the data packet; and
   receiving acknowledgments further includes:
      for single-CTB communication, receiving all acknowledgments for the data packet during said reserved CTB; and
      for multi-CTB communication, receiving each acknowledgment for the data packet during a different reserved CTB.

2. The method of claim 1 wherein the data packet includes a header comprising ReBoM information containing an identity of receivers intended for the transmission.

3. The method of claim 2 wherein the ReBoM information further contains an acknowledgment request for each of one or more of the identified receivers.

4. The method of claim 3 wherein the ReBoM information further contains an indication of a single-CTB communication sequence for the data packet.

5. The method of claim 4 wherein receiving one or more acknowledgments further includes receiving all acknowledgments for the data packet during said reserved CTB.

6. The method of claim 5 further comprising:
   receiving the transmitted data packet at a receiver;
   checking the packet header for the ReBoM information;
   based on the ReBoM information, checking the data packet for errors and generating an uplink (UL) acknowledgment packet indicating any errors in the data packet; and
   transmitting the acknowledgment packet to the coordinator over the channel during the same reserved CTB according to a schedule.

7. The method of claim 3 wherein the ReBoM information further contains an indication of a multi-CTB ReBoM communication sequence for the data packet.

8. The method of claim 1 wherein receiving one or more acknowledgments further includes receiving each acknowledgment for the data packet during a different reserved CTB.

9. The method of claim 8 further comprising:
   receiving the transmitted data packet at a receiver;
   checking the packet header for the ReBoM information;
   based on the ReBoM information, checking the data packet for errors and generating an UL acknowledgment packet indicating any errors in the data packet;
   reserving a CTB for acknowledgment; and
   transmitting the acknowledgment packet to the coordinator over the channel during the CTB for acknowledgment according to a schedule.

10. The method of claim 1 wherein the ReBoM communication comprises a one-hop communication.

11. The method of claim 1 further comprising:
receiving the transmitted data packet at a receiver;
checking the packet header for the ReBoM information;
based on the ReBoM information:
checking the data packet for errors and generating an UL acknowledgment packet indicating any errors in the data packet;
for multi-CTB communication, reserving a CTB for acknowledgment, and transmitting the acknowledgment packet to the coordinator over the channel during the CTB for acknowledgment according to a schedule indicated in the data packet; and
for single-CTB communication, transmitting the acknowledgment packet to the coordinator over the channel during the same reserved CTB according to a schedule indicated in the data packet.

12. The method of claim 1 wherein the data packet includes a header comprising ReBoM information indicating that the data packet is part of a ReBoM communication sequence.

13. The method of claim 12 further comprising:
for a data packet that is part of a ReBoM communication sequence, including ReBoM information in the packet MAC header including: the identity of receivers intended for the transmission, an acknowledgment request for each of one or more of the identified receivers, and an indication of a single-CTB or multi-CTB communication sequence for the data packet.

14. The method of claim 13 further comprising:
receiving the transmitted data packet at a receiver;
checking the packet header for the ReBoM information; and
based on the ReBoM information:
checking the data packet for errors and generating an UL acknowledgment packet indicating any errors in the data packet;
for multi-CTB communication, reserving a CTB for acknowledgment, and transmitting the acknowledgment packet to the coordinator over the channel during the CTB for acknowledgment according to a schedule indicated in the data packet; and
for single-CTB communication, transmitting the acknowledgment packet to the coordinator over the channel during the same reserved CTB according to a schedule indicated in the data packet.

15. The method of claim 1, further comprising:
receiving the transmitted data packet at a receiver;
generating an UL acknowledgment packet indicating any errors in the data packet; and
transmitting the acknowledgment packet to the coordinator over the channel during the same reserved CTB, after a time period beyond the end of the transmission of the data packet.

16. The method of claim 15 wherein said time period is a function of the number of receivers identified in the data packet header.

17. The method of claim 16 wherein said time period is determined as $N*IFS+(N-1)*Ack_{Duration}$ time units wherein N represents the total number of receivers identified in the data packet header, IFS represents an Inter-Frame Space (IFS) duration for channel switching and other overhead, and $Ack_{Duration}$ time units represents the amount of time needed for uplink transmission of an acknowledgment packet.

18. The method of claim 1 further comprising retransmitting the data packet to the receivers indicated by the acknowledgments.

19. The method of claim 1 further comprising including CRC information in the data packet for transmission error detection.

20. The method of claim 1, wherein the uncompressed video information comprises high definition (HD) video information.

21. The method of claim 20, wherein the uncompressed HD video information is wirelessly transmitted over the wireless channel using a 60 GHz frequency band.

22. An apparatus for communicating information over a wireless channel in a communication system, comprising a coordinator including:
a scheduler configured for controlling channel access by dividing a contention-free period (CFP) into one or more schedules, wherein each schedule includes one or more periodic channel time blocks (CTBs) for wireless communication, and reserving a CTB for data packet communication over the channel;
a communication module for reliable broadcast or multicast (ReBoM) communication of a data packet over the channel during the reserved CTB, and receiving one or more acknowledgments for a data packet from one or more receivers, wherein the information is uncompressed video information, wherein:
the data packet includes a header comprising ReBoM information indicating a multi-CTB ReBoM communication sequence for the data packet or a single-CTB ReBoM communication sequence for the data packet; and
the communication module is further configured such that for a single-CTB communication, the communication module receives all acknowledgments for the data packet during said reserved CTB, and for a multi-CTB communication, the communication module receives each acknowledgment for the data packet during a different reserved CTB.

23. The apparatus of claim 22 wherein the data packet includes a header comprising ReBoM information containing the identity of receivers intended for the transmission.

24. The apparatus of claim 23 wherein the ReBoM information further contains an acknowledgment request for each of one or more of the identified receivers.

25. The apparatus of claim 24 wherein the ReBoM information further contains an indication of a single-CTB communication sequence for the data packet.

26. The apparatus of claim 25 wherein the communication module is further configured for receiving all acknowledgments for the data packet during said reserved CTB.

27. The apparatus of claim 24 wherein the ReBoM information further contains an indication of a multi-CTB ReBoM communication sequence for the data packet.

28. The apparatus of claim 22 wherein the communication module is further configured for receiving each acknowledgment for the data packet during a different reserved CTB.

29. The apparatus of claim 22 wherein the ReBoM communication comprises a one-hop communication.

30. The apparatus of claim 22 wherein the data packet includes a header comprising ReBoM information indicating that the data packet is part of a ReBoM communication sequence.

31. The apparatus of claim 30 wherein for a data packet that is part of a ReBoM communication sequence, ReBoM information is included in the packet MAC header including the identity of receivers intended for the transmission, an acknowledgment request for each of one or more of the identified receivers, and an indication of a single-CTB or multi-CTB communication sequence for the data packet.

32. The apparatus of claim 22, wherein the communication module is further configured for generating an UL acknowledgment packet indicating any errors in the data packet, and transmitting the acknowledgment packet to the coordinator over the channel during the same reserved CTB, after a time period beyond the end of the transmission of the data packet wherein said time period is a function of the number of receivers identified in the data packet header.

33. The apparatus of claim 32 wherein said time period is determined as $N*IFS+(N-1)*Ack_{Duration}$ time units wherein N represents the total number of receivers identified in the data packet header, IFS represents an Inter-Frame Space (IFS) duration for channel switching and other overhead, and $Ack_{Duration}$ time units represents the amount of time needed for uplink transmission of an acknowledgment packet.

34. The apparatus of claim 22 wherein the communication module is further configured for retransmitting the data packet to the receivers indicated by the acknowledgments.

35. The apparatus of claim 22 wherein the communication module is further configured for including cyclic redundancy code (CRC) information in the data packet for transmission error detection.

36. A receiver for communicating information over a wireless channel in a communication system, comprising:
a communication module configured for receiving the transmitted data packet during a reserved channel time block (CTB) period, checking each packet header for reliable broadcast or multicast (ReBoM) information, checking the data packet for errors based on the ReBoM information, and generating an UL acknowledgment packet indicating any errors in the data packet; and
an acknowledgment module for generating an uplink (UL) acknowledgment packet indicating any errors in the data packet, transmitting the acknowledgment packet to the coordinator over the channel during the same reserved CTB according to a schedule, sending each acknowledgment for the data packet during a different reserved CTB, and transmitting the acknowledgment packet to the coordinator over the channel during a reserved CTB for acknowledgment according to a schedule, wherein the information is uncompressed video information.

37. The receiver of claim 36 wherein the ReBoM information further contains an indication of a multi-CTB ReBoM communication sequence for the data packet.

38. The receiver of claim 36 wherein the ReBoM communication comprises a one-hop communication.

39. The receiver of claim 36 wherein:
the data packet includes a header comprising ReBoM information indicating a multi-CTB ReBoM communication sequence for the data packet or a single-CTB ReBoM communication sequence for the data packet; and
the acknowledgment module is further configured such that for a single-CTB communication, the acknowledgment module sends all acknowledgments for the data packet during said reserved CTB, and for a multi-CTB communication, the acknowledgment module sends each acknowledgment for the data packet during a different reserved CTB.

40. The receiver of claim 39 wherein:
the acknowledgment module is further configured such that based on the ReBoM information, the acknowledgment module:
checks the data packet for errors and generates an UL acknowledgment packet indicating any errors in the data packet;
for a multi-CTB communication, reserves a CTB for acknowledgment, and transmits the acknowledgment packet to a coordinator over the channel during the CTB for acknowledgment according to a schedule indicated in the data packet; and
for a single-CTB communication, transmits the acknowledgment packet to the coordinator over the channel during the same reserved CTB according to a schedule indicated in the data packet.

41. The receiver of claim 36 wherein the data packet includes a header comprising ReBoM information indicating that the data packet is part of a ReBoM communication sequence.

42. The receiver of claim 41 wherein for a data packet that is part of a ReBoM communication sequence, ReBoM information is included in the packet MAC header including the identity of receivers intended for the transmission, an acknowledgment request for each of one or more of the identified receivers, and an indication of a single-CTB or multi-CTB communication sequence for the data packet.

43. The receiver of claim 42 wherein:
the acknowledgment is further configured for:
checking the data packet for errors based on the ReBoM information, and generating an UL acknowledgment packet indicating any errors in the data packet;
for a multi-CTB communication, reserving a CTB for acknowledgment, and transmitting the acknowledgment packet to a coordinator over the channel during the CTB for acknowledgment according to a schedule indicated in the data packet; and
for a single-CTB communication, transmitting the acknowledgment packet to the coordinator over the channel during the same reserved CTB according to a schedule indicated in the data packet.

44. The receiver of claim 36, wherein:
the acknowledgment module is further configured for generating an UL acknowledgment packet indicating any errors in the data packet, and transmitting the acknowledgment packet to a coordinator over the channel during the same reserved CTB, after time period beyond the end of the transmission of the data packet.

45. The receiver of claim 44 wherein said time period is a function of the number of receivers identified in the data packet header.

46. The receiver of claim 45 wherein said time period is determined as $N*IFS+(N-1)*Ack_{Duration}$ time units wherein N represents the total number of receivers identified in the data packet header, IFS represents an Inter-Frame Space (IFS) duration for channel switching and other overhead, and $Ack_{Duration}$ time units represents the amount of time needed for uplink transmission of an acknowledgment packet.

47. A method of communicating information over a wireless channel in a communication system including a coordinator and receivers, comprising the steps of:
controlling channel access by dividing a contention-free period (CFP) into one or more schedules, wherein each schedule includes one or more periodical channel time blocks (CTBs) for wireless communication;
reserving a CTB for communication of a data packet over the channel, the packet including a MAC header indicating whether it is a ReBoM or a No-ReBoM packet;
transmitting the data packet from the coordinator over the channel during the reserved CTB, wherein transmitting the data packet further includes:
for a first contention-based control period (CBCP), setting the source to the coordinator and setting the destination to a broadcast or multicast address, thereafter, the coordinator assigning CBCPs for UL acknowledgment transmission for the packet from a receiver, such that in one CBCP one UL acknowledgment is transmitted from a receiver; and receiving one or more scheduled acknowledgments for the data packet from one or more of the receivers;

wherein for a No-ReBoM packet, the identity of intended receivers and acknowledgment requests are not included in the packet, and for a ReBoM packet, the identity of intended receivers and acknowledgment requests are included in the packet, wherein the information is uncompressed video information.

48. The method of claim 47 further comprising the steps of:
receiving the transmitted data packet at a receiver;
generating an UL acknowledgment packet indicating any errors in the data packet; and
using the angular position of each device in the communication system to optimize UL acknowledgment transmission.

49. The method of claim 47 further comprising the steps of:
for a station with a MAC address k, the coordinator allocating a CBCP for the receiver with the source address as the MAC address of the receiver, K, and setting the destination address to the MAC address of the coordinator.

50. A method of communicating information over a wireless channel in a communication system including a coordinator and receivers, comprising:
controlling channel access by dividing a contention-free period (CFP) into one or more schedules, wherein each schedule includes one or more periodical channel time blocks (CTBs) for wireless communication;
reserving a CTB for reliable broadcast or multicast (ReBoM) communication of a data packet over the channel;
transmitting the data packet from the coordinator over the channel during the reserved CTB; and
receiving one or more scheduled acknowledgments for the data packet from one or more of the receivers,
wherein the data packet includes a header comprising ReBoM information indicating a multi-CTB ReBoM communication sequence for the data packet or a single-CTB ReBoM communication sequence for the data packet; and
receiving acknowledgments further includes:
for single-CTB communication, receiving all acknowledgments for the data packet during said reserved CTB; and
for multi-CTB communication, receiving each acknowledgment for the data packet during a different reserved CTB.

51. An apparatus for communicating information over a wireless channel in a communication system, comprising a coordinator including:
a scheduler configured for controlling channel access by dividing a contention-free period (CFP) into one or more schedules, wherein each schedule includes one or more periodic channel time blocks (CTBs) for wireless communication, and reserving a CTB for data packet communication over the channel;
a communication module for reliable broadcast or multicast (ReBoM) communication of a data packet over the channel during the reserved CTB, and receiving one or more acknowledgments for a data packet from one or more receivers,
wherein the data packet includes a header comprising ReBoM information indicating a multi-CTB ReBoM communication sequence for the data packet or a single-CTB ReBoM communication sequence for the data packet; and
the communication module is further configured such that for a single-CTB communication, the communication module receives all acknowledgments for the data packet during said reserved CTB, and for a multi-CTB communication, the communication module receives each acknowledgment for the data packet during a different reserved CTB.

52. A receiver for communicating information over a wireless channel in a communication system, comprising:
a communication module configured for receiving the transmitted data packet during a reserved channel time block (CTB) period, checking each packet header for reliable broadcast or multicast (ReBoM) information and checking the data packet for errors based on the ReBoM information; and
an acknowledgment module configured for generating an uplink (UL) acknowledgment packet indicating any errors in the data packet, transmitting the acknowledgment packet to the coordinator over the channel during the same reserved CTB according to a schedule, for sending each acknowledgment for the data packet during a different reserved CTB,
wherein:
the communication module is further configured for checking the data packet for errors and generating an UL acknowledgment packet indicating any errors in the data packet;
the acknowledgment module is further configured for transmitting the acknowledgment packet to the coordinator over the channel during a reserved CTB for acknowledgment according to a schedule.

53. A method of communicating information over a wireless channel in a communication system including a coordinator and receivers, comprising the steps of:
controlling channel access by dividing a contention-free period (CFP) into one or more schedules, wherein each schedule includes one or more periodical channel time blocks (CTBs) for wireless communication;
reserving a CTB for communication of a data packet over the channel, the packet including a MAC header indicating whether it is a ReBoM or a No-ReBoM packet;
transmitting the data packet from the coordinator over the channel during the reserved CTB; and
receiving one or more scheduled acknowledgments for the data packet from one or more of the receivers;
wherein for a No-ReBoM packet, the identity of intended receivers and acknowledgment requests are not included in the packet, and for a ReBoM packet, the identity of intended receivers and acknowledgment requests are included in the packet,
wherein transmitting the data packet further includes, for a first contention-based control period (CBCP), setting the source to the coordinator and setting the destination to a broadcast or multicast address, thereafter, the coordinator assigning CBCPs for UL acknowledgment transmission for the packet from a receiver, such that in one CBCP one UL acknowledgment is transmitted from a receiver.

* * * * *